United States Patent [19]

Hayashi et al.

[11] Patent Number: 4,467,903
[45] Date of Patent: Aug. 28, 1984

[54] TEMPERATURE RESPONSIVE, PNEUMATICALLY ACTUATED, FLUID SHEAR, COOLING FAN CLUTCH AND CONTROL THEREFOR

[75] Inventors: Masaharu Hayashi, Toyota; Makoto Nakagawa; Kenji Hattori, both of Kariya, all of Japan

[73] Assignee: Aisin Seiki Kabushiki Kaisha, Japan

[21] Appl. No.: 346,991

[22] Filed: Feb. 8, 1982

[30] Foreign Application Priority Data

Feb. 10, 1981 [JP] Japan ............................ 56/17928[U]

[51] Int. Cl.³ ..................... F16D 35/00; F16D 43/25
[52] U.S. Cl. ................................ 192/58 B; 192/82 T; 192/85 V
[58] Field of Search ................ 192/58 B, 82 T, 85 V, 192/85 R

[56] References Cited

U.S. PATENT DOCUMENTS

| | | | |
|---|---|---|---|
| 3,272,293 | 9/1966 | Heater | 192/58 B |
| 3,323,623 | 6/1967 | Roper | 192/58 B |
| 3,568,647 | 3/1971 | Adams | 192/58 B |
| 3,757,914 | 9/1973 | Elmer | 192/58 B X |
| 3,880,265 | 4/1975 | Elmer | 192/58 B |
| 3,990,556 | 11/1976 | Hayashi et al. | 192/58 B |
| 4,036,339 | 7/1977 | Kikuchi | 192/58 B |
| 4,056,178 | 11/1977 | Detty | 192/58 B |
| 4,133,417 | 1/1979 | Glasson et al. | 192/58 B |
| 4,295,550 | 10/1981 | Hayashi | 192/58 B |
| 4,298,111 | 11/1981 | Hayashi | 192/58 B |
| 4,351,425 | 9/1982 | Bapp | 192/58 B |

FOREIGN PATENT DOCUMENTS

| | | | |
|---|---|---|---|
| 69327 | 5/1980 | Japan | 192/82 T |
| 18022 | of 1905 | United Kingdom | 192/85 V |

Primary Examiner—Rodney H. Bonck
Assistant Examiner—David D. House
Attorney, Agent, or Firm—Finnegan, Henderson, Farabow, Garrett & Dunner

[57] ABSTRACT

A cooling fan device for use with an internal combustion engine in which there is provided a viscous fluid coupling. A viscous fluid valve is operable to control the opening of a hole so as to regulate the flow of fluid from a working chamber to a reservoir chamber. The valve which is operated in response to the change in the temperature of the engine cooling water, is secured to a slidable plug which is surrounded by a diaphragm. A changeover valve controls the admission of suction air (vacuum) or atmospheric air in response to the change in engine pressure.

1 Claim, 1 Drawing Figure

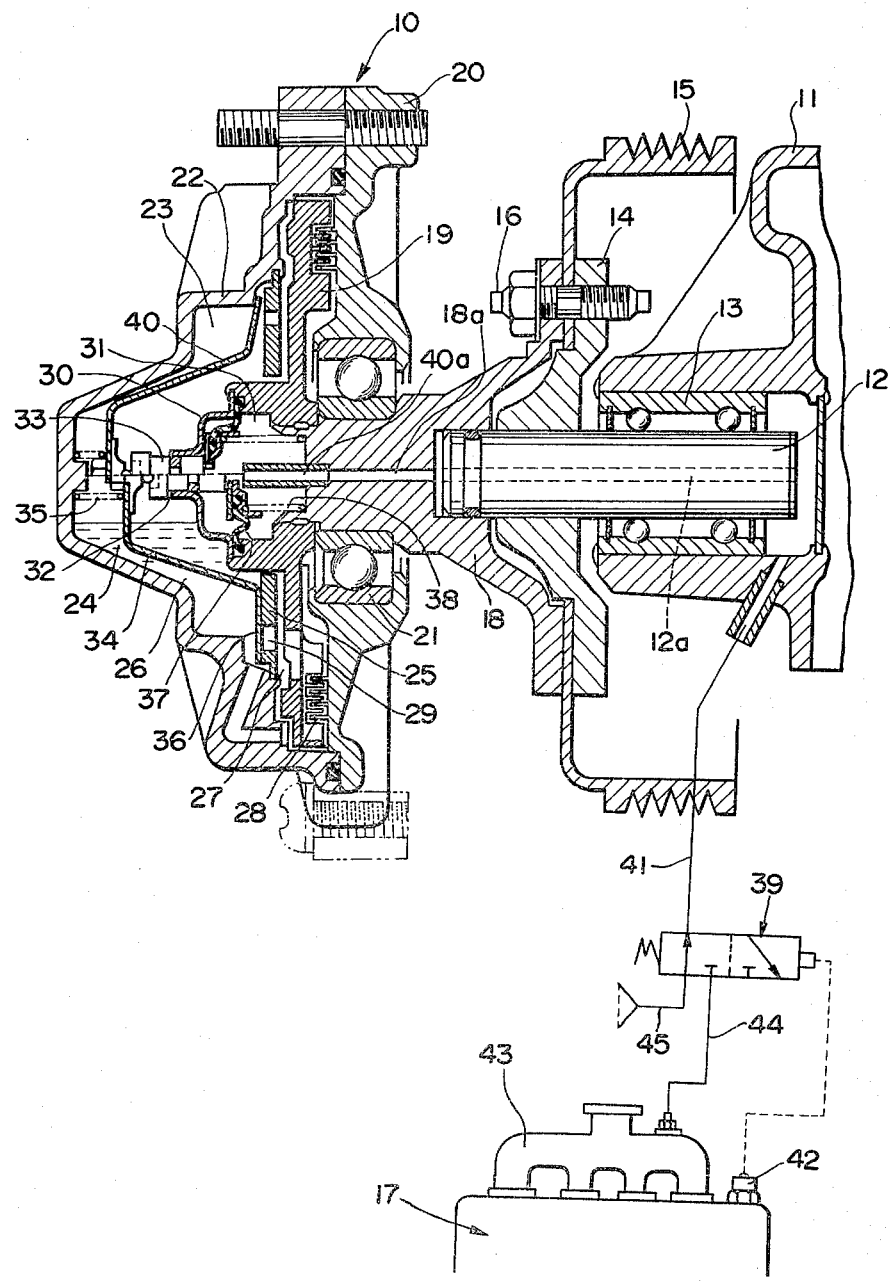

TEMPERATURE RESPONSIVE, PNEUMATICALLY ACTUATED, FLUID SHEAR, COOLING FAN CLUTCH AND CONTROL THEREFOR

This invention relates to a cooling fan device for use with an internal combustion engine, particularly but not exclusively, mountable on a vehicle.

Hithertofore, there has been designed a cooling fan device which comprises a viscous fluid coupling drivingly connected between an associated engine and a cooling fan and operable in response to the environmental temperature of an engine room to vary the speed of rotation of the fan cooling a radiator of the engine. However, such an arrangement is unsatisfactory, because the response of the viscous fluid coupling to changes in the temperature of the engine itself is largely delayed.

It is, therefore, an object of the present invention to provide a cooling fan device for use with an internal combustion engine in which the above-mentioned drawbacks of the prior art are removed.

Another object of the invention is to provide a cooling fan device operable with high reliability and high performance.

According to the present invention, there is provided a cooling fan device for use with an internal combustion engine comprising a viscous fluid coupling means which includes an input means drivingly connected to the engine, an output means provided with a fan for cooling a radiator of the engine and rotatable relative to the input means, the input and the output means defining therebetween a working chamber into which an amount of viscous fluid can be admitted to hydrodynamically transmit rotational power from the input means to the output means, said output means having a partition means for separating from the working chamber a reservoir chamber provided in the output means for storing an additional amount of the viscous fluid, the partition means having formed therein a hole for permitting flow of the viscous fluid from the working chamber to the reservoir chamber, and a valve means operable to close the hole thereby causing a decrease in the amount of the viscous fluid within the working chamber to reduce the power transmitted from the input means to the output means, and means for sensing the temperature of the engine and operating the valve means to open or close the hole in response to a change in the temperature of the engine.

The above and other objects and features of the present invention will become apparent from the following description of the preferred embodiment with reference to the accompanying drawing, in which:

The accompanying drawing in a side elevation in section of an example of a cooling fan device in accordance with the present invention operationally connected to an associated internal combustion engine schematically shown.

Referring to the drawing, there is shown a cooling fan device having a viscous fluid coupling 10 mounted on a fixed portion 11 to the body of a vehicle. The coupling 10 comprises a shaft 12 rotatably supported by the fixed portion 11 through a bearing 13. A flange member 14 fixed to the shaft 12 and a belt wheel 15 is fixed by bolts 16 (only one being seen in the drawing) to the flange member 14. The belt wheel 15 is connected by V-belts (not shown) to a rotary shaft of an internal combustion engine 17 so that the belt wheel is, in operation, rotated at a predetermined speed. An input member 18 is provided co-axially with the shaft 12 and is fixed at its one end to the flange member 14 by the bolts 16 together with the belt wheel 15. An input disc or rotor 19 is fixed to the opposite end of the input member 18 and a disc-like output member or a hub of a cooling fan 20 is supported on a mid-portion of the input member 18 through a bearing 21 so as to be rotatable relative to the member 18 and the disc 19. An outer cover member 22 is fixed at its periphery to the output member 20 in fluid tight relationship therewith to define a chamber 23 together with the output member 20. An appropriate amount of viscous fluid 24 is continued in chamber 23 and a partition plate 25 is fixed at its outer periphery to the cover member 22 to divide the chamber 23 into a reservoir chamber 26 and a working chamber 27. The input disc 19 is confined within the chamber 27 and labyrinth grooves 28 are formed in surfaces of the side wall of the input disc 19 and in an inner wall of the output member 20. A hole 29 is formed in the partition plate 25 for permitting fluid communication between the reservoir and working chambers 26 and 27.

There is further provided an inner cover member 30 which is co-axially fixed in fluid tight relationship at its outer periphery to a boss of the input disc 19 to define an air chamber 31. The inner cover member 30 is formed with a center opening 32 through which an axially slidable plug 33 extends in sealing relationship therewith. The plug 33 supports at its outer end a valve member 34 through a thrust bearing, the valve member 34 being urged by a spring 35 towards the plug 33 and provided at its outer periphery with a radially extending flat surface portion 36 which serves to open or close the hole 29 of the partition plate 25, as the valve member 34 axially moves as described below.

A diaphragm 37 is provided within the air chamber 31, the outer periphery of the diaphragm 37 being fixed to a boss of the input member 18 and the inner periphery of the diaphragm 37 being fixed to the inner opposite end of the plug 33 which is subjected to the action of a further spring 38 for balancing against the force of the spring 35. The air chamber 31 is communicated with a charge-over valve 39 by way of a center bore 40a of a stop 40, a center bore 18a of the input member 18, a center bore 12a of the shaft 12 and a conduit 41.

The change-over valve 39 is operated in response to a signal derived from a temperature sensor 42 provided on the engine 17 for sensing a change in the temperature of the cooling water flowing therethrough. Thus, when the temperature of the cooling water is lower than a predetermined value, the changeover valve 39 is displaced so that the conduit 41 is communicated with an air intake manifold 43 of the engine 17 through a conduit 44 to supply a suction pressure to the chamber 31, and when the temperature of the cooling water is higher than the predetermined value, the change-over valve 39 is displaced in the opposite direction to open the conduit 41 and thus the chamber 31 through a conduit 45 to atmosphere.

In the event that the suction pressure of the manifold 43 is supplied to the chamber 31 in such a way as described above, the plug 33 and the valve member 34 are axially moved rightwards as viewed in the drawing to a position shown in the lower half portion of the drawing and at which position the plug 33 abuts against the stop 40 and the flat surface portion 36 of the valve member 34 closes the hole 29 of the partition plate 25 to reduce the amount of the viscous fluid 24 contained in the working chamber 27 thereby reducing the rotational power transmitted from the input disc 19 to the output member 20 to lower the speed of rotation of the cooling fan.

In the event that the chamber 31 opens to atmosphere in such a way as described above, the plug 33 and the valve member 34 are moved in the opposite direction to an alternative position shown in the upper half portion of the drawing and at which position the valve member 34 opens the hole 29 to cause fluid communication between reservoir and working chambers 26 and 27 thereby increasing the amount of the viscous fluid 24 within the working chamber 27 to increase the rotational power transmitted from the input disc 19 to the output member 20 increasing the speed of rotation of the cooling fan.

The invention has been shown and described with reference to the specific embodiment, however, it should be noted that the invention is in no way limited to the details of the illustrated structures but changes and modifications may be made without departing from the scope of the appended claims.

We claim:

1. A cooling fan device for use with an internal combustion engine, comprising:

a viscous fluid coupling means which includes an input means drivingly connected to the engine, an output means provided with a fan for cooling a radiator of the engine and rotatable relative to said input means, said input and output means defining therebetween a fluid-tight working chamber into which an amount of viscous fluid can be admitted to hydrodynamically transmit rotational power from said input means to said output means, said output means having a partition means for separating from said working chamber a reservoir chamber provided in said output means for storing an additional amount of the viscous fluid, said partition means having formed therein a hole for permitting the flow of the viscous fluid from said working chamber to said reservoir chamber, and a viscous fluid valve means operable to close said hole thereby causing a decrease in the amount of the viscous fluid within said working chamber to reduce the power transmitted from said input means to said output means, and means for controlling the operation of said viscous fluid valve means, said control means including means for sensing the temperature of engine cooling water, a slidable plug on the reservoir chamber side of said partition means, an inner cover secured to said input means to form an air chamber therein, said inner cover having a center opening through which said slidable plug extends in sealing relationship therewith, a diaphragm dividing said air chamber into two opposed chambers, the outer periphery of said diaphragm being fixed to said input means and the inner periphery of said diaphragm being attached to an inner end of said slidable plug, said viscous fluid valve means being secured to an outer end of said plug to open or close said hole of said partition means, changeover valve means connected to a source of suction air pressure and a source of atmospheric air pressure, passage means connecting said changeover valve means and a first one of said opposed chambers, said changeover valve means being for regulating in accordance with the temperature of the engine cooling water the supply of suction pressure and atmospheric pressure through said passage means into said first opposed chamber defined by said diaphragm for moving said plug and said fluid valve means secured thereto to effect control of viscous fluid flowing to said working chamber and provide variation in the speed of rotation of said fan.

* * * * *